Jan. 22, 1935.  E. C. CLIFFORD  1,988,965
TRACTION DEVICE FOR TIRES
Filed June 22, 1934  3 Sheets-Sheet 1
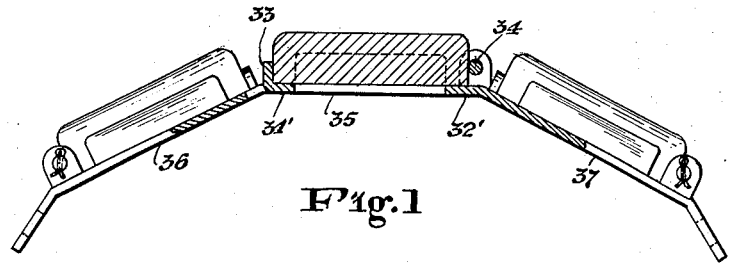
INVENTOR
EDWARD C. CLIFFORD
BY
ATTORNEY

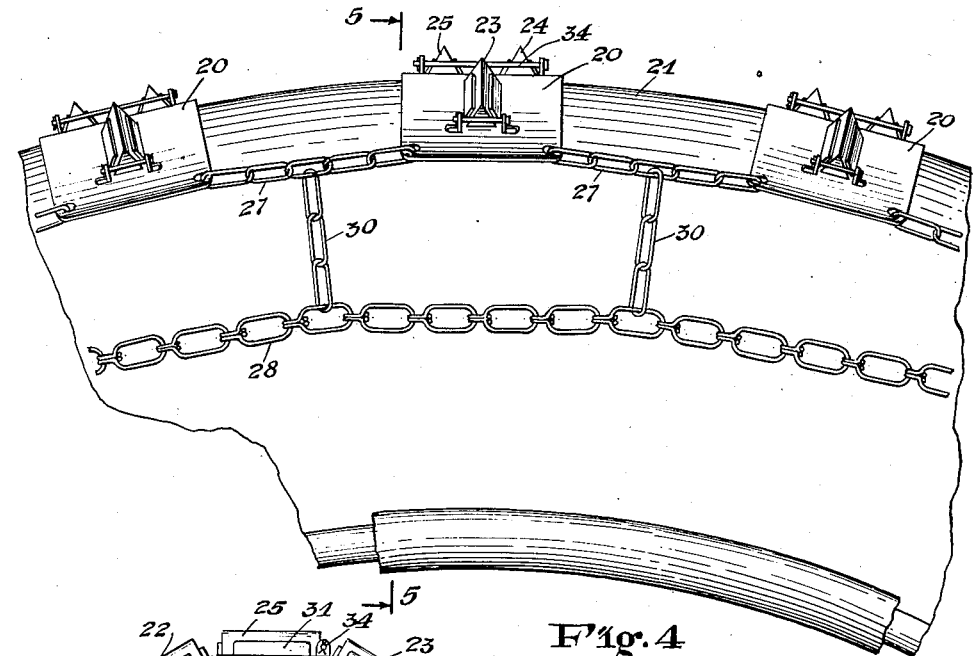
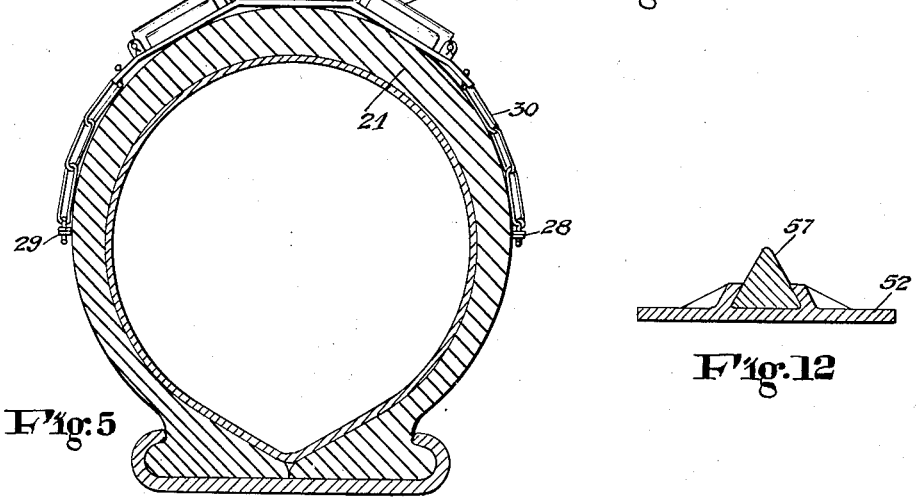 
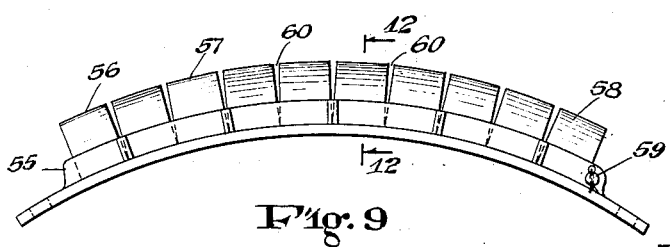

Jan. 22, 1935.   E. C. CLIFFORD   1,988,965
TRACTION DEVICE FOR TIRES
Filed June 22, 1934   3 Sheets-Sheet 3

INVENTOR
EDWARD C. CLIFFORD
BY
ATTORNEY

Patented Jan. 22, 1935

1,988,965

UNITED STATES PATENT OFFICE 1,988,965

TRACTION DEVICE FOR TIRES

Edward C. Clifford, Sand Lake, N. Y.

Application June 22, 1934, Serial No. 731,915

11 Claims. (Cl. 152—14)

This invention relates to traction devices of the type generally known as tire chains, which are applied to automobile tires to prevent skidding and spinning of the wheels on wet, slippery road surfaces and in mud, loose sand, snow, ice, etc.

The improved traction device forming the subject of this invention may serve as a protection of the tires against wear and also as a means for increasing the friction between the tire and the ground without liability of injury to the tire. In the latter capacity my improved device combines efficient traction qualities on smooth and hard road surfaces, with improved traction and anti-skidding qualities in soft and yielding ground, such as mud, sand, snow and the like.

The primary object of the invention is to provide, in a device of the character specified, a plurality of traction elements, each equipped with gripping means of a detachable and replaceable character, said gripping means exerting a very positive action, especially when the vehicle travels over relatively soft ground.

Another object is to provide, in a device of the character specified, a plurality of gripping members, each provided with a plurality of gripping edges, said gripping members being arranged in such manner that they may be readily removed and turned around, in order to expose a new gripping edge when the one previously exposed has been worn down.

A further object of the invention is to provide, in a device of the character specified, comprising a plurality of traction elements, gripping members adapted to be removably inserted in position in said traction elements, said gripping members consisting of straight bar pieces of suitable section, and being, therefore, adapted to be produced at relatively low cost, merely by sawing a long bar into a number of pieces of the required length.

A still further object is to provide in a device of the character specified, a plurality of traction elements of a novel and improved design, said traction elements each consisting of a plate member and a plurality of gripping members outwardly projecting therefrom, said gripping members being transversely directed with respect to the tire and being arranged in a staggered relation to one another so as to provide end edges directly above the tread portion of the tire, effectively preventing skidding due to lateral thrust.

Other objects and advantages of the present invention will more fully appear as the description proceeds and will be set forth and claimed in the appended claims.

My invention is illustrated by way of example in the accompanying drawings, in which:

Fig. 1 is a front view in elevation, partly sectioned, of a traction element embodying one of the forms of my invention;

Fig. 2 is a plan view thereof;

Fig. 3 is a cross section through line 3—3 of Fig. 2;

Fig. 4 is a fragmentary view in elevation of a tire, showing a tire chain, comprising traction elements of the type shown in Figs. 1, 2, 3, in position;

Fig. 5 is a transverse sectional view on line 5—5 of Fig. 4;

Fig. 6 is a cross sectional view similar to that of Fig. 3, illustrating a somewhat different construction of plate for the traction element;

Fig. 7 is a cross section of a traction element illustrating a gripping member having an outline different from that shown in Figs. 2, 3 and 6;

Fig. 8 is a cross section of another traction element, illustrating a gripping member having a still different section;

Fig. 9 is a front view in elevation of a traction element embodying my invention in a different form;

Fig. 12 is a cross sectional view of the same through line 12—12 of Fig. 10;

Figure 10:
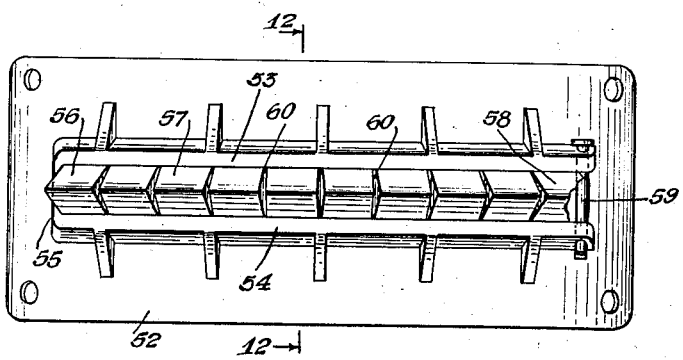
Fig. 10 is a plan view thereof, with parts partly broken away.
Figure 11:
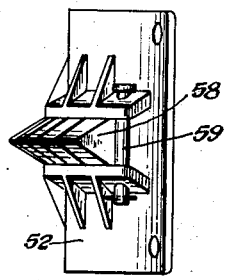
Fig. 11 is a side view in elevation of the same.

Referring to Figs. 1 to 5, it is seen that each traction element comprises a plate 20, bent to conform substantially to the transverse curvature of the tire 21, and one or more gripping members 22, 23, 24, 25, which are removably secured onto plate 20.

Said plate is shown as consisting of a strip of sheet metal, provided at each corner with an opening 26, said openings being loosely engaged by chain sections 27, forming with the traction elements, a tire chain embracing the circumference of the tire. The tire chain also comprises two side chains 28, 29, which are connected to chain sections 27 at spaced intervals by means of short chain sections 30.

For the purpose of holding each gripping member in position, the plate is formed with two upwardly and inwardly inclined flanges, such as shown at 31, 32, in correspondence of gripping member 25, said flanges running in a transverse direction with respect to the tire and being struck from the body of the plate. As shown in the drawings, said flanges form guiding and retaining passages for the gripping members, which are slidably inserted therethrough, and which are substantially triangular in section. The gripping members are longer than the flanges and, therefore, their two ends are supported by the body of the plate, as clearly shown at 31', 32' in Fig. 1. When a gripping member is inserted in position between its flanges, it is slid therethrough until its end strikes a stop, which may be of any suitable design, for instance, a lug 33, struck off the body of the plate and bent upwardly therefrom. A removable stop member, such as, for instance, a pin 34, can then be set in position against the other end, so that the gripping member will thus be positively prevented from sliding off.

In the structure illustrated, where the traction element is equipped with four gripping members, the plate can have a curved outline, following the outline of the tire, and in such case the gripping members may also be curved to follow the curvature of the plate.

The resulting structure will be possessed of greater efficiency than kindred devices heretofore known, in which the traction elements are equipped with only one gripping element running from side to side, because the staggered arrangement of the gripping members and their end surfaces greatly enhance the anti-skidding qualities of the device, not only in the direction of travel of the tire, but also transversely thereof.

However, one of the major advantages of my invention resides in the use of gripping members consisting of straight pieces of metal, having a suitable section, provided with a plurality of gripping edges which can be exposed in turn. Thus, in the case illustrated, the gripping members consist of short lengths of a metal bar, having an equilateral triangular section, preferably with rounded edges, so that when the exposed edge has been worn down to a certain extent, the gripping member can be removed, turned around 120° and reinserted in position in order to expose another gripping edge.

In this manner the life of the gripping members is increased three-fold, and it can be readily understood that this represents an advantage of considerable importance as against the use of gripping members, which having a curved outline, cannot be turned around and must, therefore, be replaced by new gripping members when worn down.

Of course, since the plate must have an outline substantially following the curvature of the transverse section of the tire, in order to use straight gripping members they must necessarily be of relatively short length. In the construction illustrated in Figs. 1 to 5, the plate may be bent to assume a substantially segmento-polygonal outline, forming a central flat section 35 and two side plate sections 36, 37, at an angle thereto; or else the plate itself may have a continuous curved outline, but the portions thereof, such as 31', 32', forming a support for the ends of the gripping members should be flattened so as to form, together with the flanges, a straight passage-way for the gripping members to be used in conjunction therewith.

In view of the fact that the gripping members are to be turned around, in order to wear out all the three edges thereof, the retaining flanges should preferably be obtained by splitting the metal of the plate along the central line of the gripping member and bending it upwardly, as shown in Fig. 3, this necessitating the use of gripping members longer than the flanges so that, as stated, they may be supported at the two ends. This construction provides flanges having a height sufficient to retain the gripping member therebetween, even when the two edges adjacent the base of the gripping member have been worn down to a considerable extent.

However, if the gripping members have a sufficiently large section, it is possible to adopt the construction shown in Fig. 6, where the flanges 38, 39, obtained from the plate 40, to guide and retain gripping members 41, are struck off the body of the plate so as to form two openings 42, 43, leaving a longitudinal member 44 supporting the entire length of the gripping member. Such a construction makes it possible to use gripping members of any suitable desired length, irrespective of the length of the flanges.

I prefer to use bar sections having rounded edges, because sharp edges are very objectionable for use on hard cement roads, on account of the damage that they cause to the road. However, the section of the gripping members need not necessarily be triangular with straight sides, but may have concave or even convex sides, if desired. For instance, a preferred section of gripping member is shown in Fig. 7, where 45 is the plate member, formed with retaining flanges 46, 47, and 48 is the gripping member removably inserted between said flanges, said gripping member being of triangular section with concave sides, as shown at 49, and rounded edges, as shown at 50.

While a substantially triangular section is to be preferred for the gripping members as providing a wide base and a firm anchorage, together with an efficient gripping edge, the inventive idea is by no means limited to the use of three-sided gripping members. For instance, in Fig. 8, I illustrate the possibility of using a gripping member 51, having an 8-section, said gripping member thus being provided with two gripping edges instead of three. In certain instances, the section shown in Fig. 8 may be preferable to the section shown in Figs. 3, 6 and 7, due to the fact that for the same effective gripping edge, the gripping member has a narrower base than in the preceding instances and, therefore, permits the use of a narrower plate member.

In a broad sense, my inventive idea is not limited to the use of guiding runways for gripping members having flat supporting surfaces, nor is it limited to the use of plates made of sheet metal and formed with retaining flanges struck off the body thereof. For instance, in Figs. 9 to 12, I illustrate a traction element comprising a plate member 52, curved to conform to the cross sectional outline of the tire, said plate being cast out of malleable iron, or any other suitable metal, and being formed integral with two transversely running flanges 53, 54, forming a dove-tailed runway having an end wall 55, adapted to receive a series of three-cornered blocks, such as 56, 57, together forming a gripping member which is virtually continuous from side to side.

After the last block 58 is inserted in the runway, the entire series of blocks may be locked in place by means of a pin 59, running across the open end of the runway, or in any other suitable manner.

It will be observed that in this type of construction the fundamental idea of providing gripping members which can be turned around in order to replace a worn gripping edge with a new one has been preserved. In addition, it may be pointed out that since the various blocks are cut with parallel ends, when they are arranged along the curved runway their adjoining ends will diverge, as shown at 60, and will thus provide edges running longitudinally of the tread of the tire, which will be very effective in checking any tendency to skidding.

Figure 13:
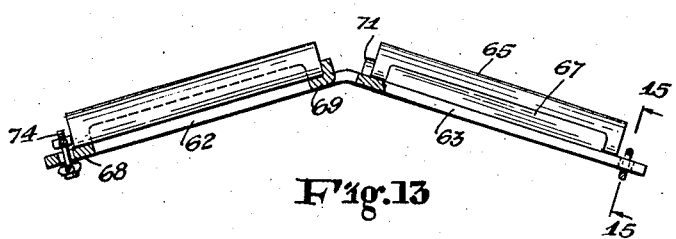
Fig. 13 is a front view in elevation partly sectioned of a traction element, embodying another alternative form of my invention.
Figure 14:
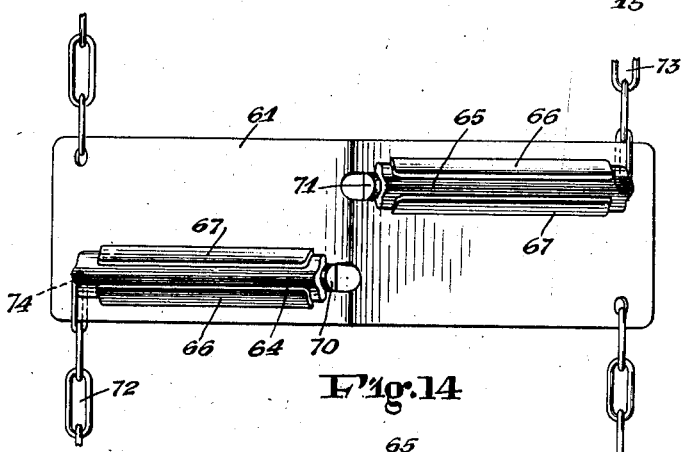
Fig. 14 is a plan view of the same.
Figure 15:
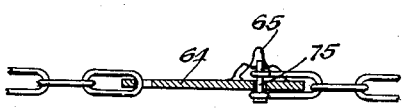
Fig. 15 is a vertical cross section through line 15—15 of Fig. 13.

In Figs. 13, 14, 15, I illustrate still another construction of traction element, embodying my invention. The same is shown composed of a plate member 61, slightly slanted downwardly from the middle towards each side, forming two substantially straight, or but slightly curved, portions 62, 63, arranged at an angle to each other, so as to substantially follow the cross sectional outline of the tread portion of the tire. The plate is shown relatively narrow in a front to rear direction and provided with only two gripping members 64, 65, located one on each portion 62, 63, in a staggered relation to each other. Said gripping members are shown as being guided and retained by side flanges, such as 66, 67, similar to those shown in Figs. 1, 2, 3, the gripping members being longer than the flanges and being supported at the two ends as shown at 68, 69.

A stop lug, such as 70, 71, is provided at the inner end of each runway, in proximity of the middle of the plate member. The outer end of each gripping member is retained in position by the attaching link of one of the circumferential chain sections, such as 72, 73, interconnecting adjoining traction elements, and to this end the plate member is provided with openings, such as 74, in correspondence of the outer end of each gripping member, making it possible to insert therethrough a detachable chain link, such as shown at 75, in Fig. 15.

This arrangement represents a simplification of those previously described, in that it enables the circumferential chain sections to perform a double function and to obviate the necessity of using separate means for locking the gripping members in position.

It will be observed that in both the construction of traction element just described and that shown in Figs. 1 to 3, the inner ends of the gripping members constitute effective means to checking any tendency to side skidding; said action being effective against lateral thrust in either direction, due to the fact that part of the end surfaces of the gripping members will act to check skidding in one direction while the remaining end surfaces will check skidding in the opposite direction.

Figure 16:
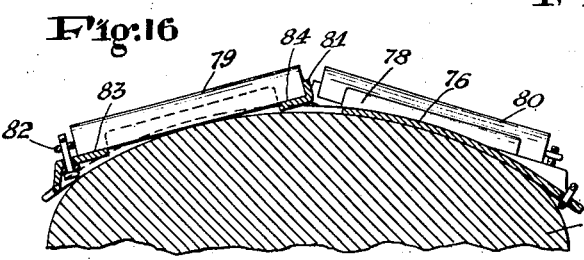
Fig. 16 is a vertical longitudinal section through a traction element of the type similar to that shown in Figs. 13, 14, 15.

In Fig. 16 I have endeavored to more clearly set in evidence some of the important advantages of the invention. In the same the plate member 76 is shown having a continuous curved outline substantially following the contour of the tread portion of tire 77. Flanges, such as 78, are struck off the body of the plate member and bent upwardly thereof so as to be inwardly inclined to form guideways adapted to receive and retain the gripping members, such as 79, 80, of the type shown in Figs. 13, 14, 15.

As explained in connection with said figures, the plate member is formed with a stop member, such as 81, opposite the inner end of each guideway, forming an abutment for the inner end of the corresponding gripping member and a removable stop means, such as, for instance, a detachable chain link such as 82, of one of the circumferential chain sections, is provided, in order to retain each gripping member in position.

In said figure, it will be observed that although the plate member itself has a continuous curved outline, the portions thereof forming supports for the ends of the gripping members are slightly offset the body of the plate member, as shown at 83, 84, so as to form substantially straight aligned surfaces completing the straight guideway required for each gripping member.

The figure clearly shows that the opening between the two end supports of each gripping member makes it possible for said gripping member to have a straight lower surface without interfering with the virtual continuity of contact between the plate member and the tire, said straight lower surface subtending the arc of the body portion of the plate member in correspondence thereof and projecting through the opening of the plate member. This is a very important feature making it possible to attain a condition whereby the pressure is evenly distributed over practically the entire surface of the plate member.

This condition having thus been realized, as a consequence we have straight gripping members, which can be produced merely by cutting bars, rolled or drawn in the proper section, into short lengths, that can be standardized for all kinds and sizes and outlines of plate members, whereas when gripping members following the curvature of the plate member are used standardization is out of the question.

A very important advantage is that by producing the retaining flanges so as to leave an opening running for the entire width of the guideway, said flanges will project enough from the surface of the plate member to accommodate and securely retain base edges having a section full enough to serve as gripping edges, and as stated before, to retain such base edges even when they have been worn down through use as gripping edges; at the same time making it possible to use gripping members having a smaller section than if flanges of the type shown in Fig. 6 were used.

It is, therefore, to be inferred that when the plate is made of sheet metal and the flanges are struck off therefrom, the construction shown in Figs. 3, 7 and 16 is to be preferred to the construction shown in Fig. 6.

From the foregoing it will be seen that my inventive idea may be applied in a number of different ways without losing its essential characteristics; the drawings, therefore, should be understood as being intended for illustrative purposes only and not in a limiting sense.

I accordingly reserve the right to carry my invention into practice in all those ways and manners which may enter, fairly, into the scope of the appended claims.

I claim:

1. In a traction device for tires the combination, with a plate member extending between the sides thereof, said plate member being formed with a longitudinally directed guideway having inwardly directed retaining sides, of a substantially straight gripping member removably insertable endwise within said guideway, said gripping member having a plurality of longitudinal gripping edges symmetrically arranged along the periphery thereof, so as to be insertable through said guideway at various angular positions, one of said gripping edges projecting through the top of said guideway, when said gripping member is inserted therethrough in any one of its angularly displaced operative positions.

2. In a traction device for tires the combination, with a plate member extending between the sides thereof, said plate member being formed with a longitudinally directed guideway having inwardly directed retaining sides, of a substantially straight gripping member removably insertable endwise within said guideway, said gripping member consisting of a uniformly sectioned short bar length having a plurality of longitudinal gripping edges symmetrically arranged along the periphery thereof, so as to be insertable through said guideway at various angular positions, one of said gripping edges projecting through the top of said guideway, when said gripping member is inserted therethrough in any one of its angularly displaced operative positions.

3. In a traction device for tires the combination, with a plate member extending between the sides thereof, said plate member being formed with a longitudinally directed guideway having inwardly inclined retaining sides, of a substantially straight gripping member removably insertable endwise within said guideway, said gripping member consisting of a uniformly sectioned short bar length having three longitudinal gripping edges symmetrically arranged along the periphery thereof, so as to be insertable through said guideway at various angular positions, one of said gripping edges projecting through the top of said guideway, when said gripping member is inserted therethrough in any one of its angularly displaced operative positions.

4. In a traction device for tires the combination, with a plate member extending between the sides thereof, said plate member being formed with a longitudinally directed guideway having inwardly inclined retaining sides, of a substantially straight gripping member removably insertable endwise within said guideway, said gripping member having a plurality of longitudinal gripping edges symmetrically arranged along the periphery thereof, so as to be insertable through said guideway at various angular positions, one of said gripping edges projecting through the top of said guideway, when said gripping member is inserted therethrough in any one of its angularly displaced operative positions, said gripping edges having a rounded contour.

5. In a traction device for tires, a traction element comprising a plate member extending between the sides thereof, said plate member being formed with a substantially straight guideway having a substantially dovetailed section, and having a substantially flat base supporting surface, a substantially straight gripping member removably insertable endwise within said guideway, said gripping member having a plurality of longitudinal gripping edges symmetrically arranged along the periphery thereof, so as to be insertable through said guideway at various angular positions, one of said gripping edges projecting through the top of said guideway, when said gripping member is inserted therethrough in any one of its angularly displaced operative positions, and removable means for locking said gripping member in position.

6. In a traction device for tires, a traction element comprising a plate member extending between the sides thereof, said plate member being formed with a substantially straight guideway having a substantially uniform dovetailed section, and having a substantially flat base supporting surface, a substantially straight gripping member removably insertable endwise within said guideway, said gripping member consisting of a uniformly sectioned short bar length having a plurality of longitudinal gripping edges symmetrically arranged along the periphery thereof, so as to be insertable through said guideway at various angular positions, one of said gripping edges projecting through the top of said guideway, when said gripping member is inserted therethrough in any one of its angularly displaced operative positions, and removable means for locking said gripping member in position.

7. In a traction device for tires, a traction element comprising a plate member extending between the sides thereof, said plate member being formed with a guideway having a substantially uniform dovetailed section, a plurality of substantially straight gripping elements insertable end to end through said guideway, said gripping elements each having a plurality of longitudinal gripping edges symmetrically arranged along the periphery thereof, so as to be insertable through said guideway at various angular positions, one of said gripping edges projecting through the top of said guideway when said gripping elements are inserted therethrough in any one of their angularly displaced operative positions, and removable means for locking said gripping elements in position.

8. In a traction device for tires, a traction element comprising a plate member extending between the sides thereof, said plate member being formed with a plurality of longitudinally directed guideways having a substantially dovetailed section, said guideways being staggered with respect to one another both in a longitudinal and transversal sense, a substantially straight gripping member removably insertable endwise through each guideway, said gripping members each having a plurality of longitudinal gripping edges symmetrically arranged along the periphery thereof, so as to be insertable through its guideway at various angular positions, one of said gripping edges projecting through the top of said guideway, when said gripping member is inserted therethrough in any one of its angularly displaced operative positions, and removable means for locking each gripping member in position.

9. In a traction device for tires, a traction element comprising a plate member extending between the sides thereof, said plate member being formed with a plurality of longitudinally directed substantially straight guideways having a substantially uniform dovetailed section, said guideways being staggered with respect to one another both in a longitudinal and transversal sense, a substantially straight uniformly sectioned gripping member removably insertable endwise through each guideway, said gripping members each having a plurality of longitudinal gripping edges symmetrically arranged along the periphery thereof, so as to be insertable through its guideway at various angular positions, one of said gripping edges projecting through the top of said guideway, when said gripping member is inserted therethrough in any one of its angularly displaced operative positions, and removable means for locking each gripping member in position.

10. In a traction device for tires, a traction element comprising a plate member extending between the sides thereof, said plate member being formed with a plurality of longitudinally directed substantially straight guideways having a substantially uniform dovetailed section, said guideways being staggered with respect to one another both in a longitudinal and transversal sense, a substantially straight uniformly sectioned gripping member removably insertable endwise through each guideway, said gripping members each consisting of a uniformly sectioned short bar length having three longitudinal gripping edges symmetrically arranged along the periphery thereof, so as to be insertable through its guideway at various angular positions, one of said gripping edges projecting through the top of said guideway, when said gripping member is inserted therethrough in any one of its angularly displaced operative positions, and removable means for locking each gripping member in position.

11. In a traction device for tires, a plate element extending between the sides thereof, said plate member being formed with two guideways running in a substantially longitudinal direction with respect to said plate element, and having a substantially dovetailed section, said guideways being spaced from each other in a circumferential direction, and each extending from a point in proximity of one of the ends of said plate member to the middle portion thereof, a bar-shaped gripping member insertable endwise through each guideway, a stop member for each gripping member facing the inner end of its corresponding guideway, and a chain section detachably connected to said plate member at a point directly facing the outer end of each guideway, so as to project above the surface of said plate member and constitute a means for preventing said gripping member from slipping off said guideway.

EDWARD C. CLIFFORD.